United States Patent Office 2,764,587
Patented Sept. 25, 1956

2,764,587
PHENOLS FROM CERTAIN CARBOXYLIC ACIDS

Marshall B. Pearlman, Concord, Calif., assignor to The Dow Chemical Company, Midland, Mich., a corporation of Delaware No Drawing. Application January 8, 1954,
Serial No. 403,050

6 Claims. (Cl. 260—289)

This invention relates to a method for making phenolic compounds from certain monocarboxylic acids. It relates in particular to such a method applied to naphthoic acids, pyridine carboxylic acids and quinoline carboxylic acids.

Specifically, it has been found that phenolic compounds may be made from carboxylic acids having the formula R—COOH, wherein R is a member of the group consisting of naphthyl, pyridyl, quinolyl and isoquinolyl radicals, in which any non-carboxyl substituent is inert to the oxidizing action of cupric ions, and which has at least one unsubstituted position on the nucleus adjacent to the point of attachment of the carboxyl group. Examples of acids which are susceptible to the process of this invention are 1-naphthoic acid, 2-naphthoic acid, 8-nitro-1-naphthoic acid, 5-chloro-1-naphthoic acid, 4-methyl-1-naphthoic acid, 5-bromo-2-naphthoic acid, 4-pyridinecarboxylic acid, nicotinic acid, quinaldic acid, cinchoninic acid, 7-quinolinecarboxylic acid, quinolinic acid, 2-methyl-6-quinolinecarboxylic acid, 6-nitro-isoquinoline carboxylic acid, and others conforming to the foregoing definition.

The method whereby phenolic compounds may be made in significant yields from the described acids consists essentially in heating the acids with a cupric compound at a temperature above 200° C. at which carbon dioxide is liberated, in the presence of water and preferably in the presence of a gas containing free oxygen. The reaction may be effected under superatmospheric pressure, as in a closed vessel, but it may also be carried out at atmospheric or subatmospheric pressure. Thus, the acid may be brought in liquid or vaporous condition into contact with a bed containing a cupric compound at a temperature from 200° to 500° C., and the phenolic compound may be removed from the copper body by steaming, by blowing with an inert gas such as nitrogen, or by extraction with an inert solvent. The presence of water vapors in the reaction zone reduces the amount of undesirable by-product and tar formation, and the continuous or intermittent supply of air or oxygen maintains or restores the cupric condition in the copper body which serves as the catalyst or oxygen carrier.

The cupric compound employed may be cupric oxide, the cupric salt of a strong mineral acid such as cupric sulfate or cupric chloride, or a cupric salt of an organic acid, particularly that of the acid to be converted to a phenolic compound. It is most conveniently and economically supplied initially as cupric sulfate or other salt which is soluble in water.

Tests have shown cupric compounds to be unique in their effect on the conversion of aromatic carboxylic acids to phenols, since the salts of aluminum, cadmium, cobalt, chromium, iron, lead, manganese, mercury, potassium, silver, tin and zinc produce no such effect and those of nickel and uranium effect only a very slight and commercially impractical conversion of the carboxylic acids to phenols. It has also been found that the effect of the cupric compound is augmented by the presence of a salt or oxide of lithium, sodium, potassium, magnesium, barium or cobalt, but that these agents have no effect unless the cupric compound is present.

As will be noted in the following examples, the phenolic hydroxyl group appears in a position on the ring adjacent to that occupied by the carboxyl group, so it is believed necessary that there be an open or unsubstituted position adjacent to the point of attachment of the carboxyl in the acid being treated.

In the following examples, the identified acid was heated in a sealed vessel to 240° C. for 2 hours in contact with about 1 mol of cupric sulfate per mol of the acid, and 2 mols of water. The vessel was opened and the contents were removed and analyzed, and the products identified.

Examples

| Acid | Principal Phenolic Product |
|---|---|
| 1. 1-Naphthoic | 2-naphthol. |
| 2. 2-Naphthoic | Do. |
| 3. 8-Nitro-1-naphthoic | 8-nitro-2-naphthol. |
| 4. 4-Methyl-1-naphthoic | 4-methyl-2-naphthol. |
| 5. 5-Bromo-2-naphthoic | 8-bromo-2-naphthol. |
| 6. 4-Pyridinecarboxylic | 3-hydroxypyridine. |
| 7. Nicotinic | 2- and 4-hydropyridines. |
| 8. Quinaldic | 3-hydroxyquinoline. |
| 9. Cinchoninic | Do. |
| 10. 7-Quinolinecarboxylic | 6- and 8-hydroxyquinolines. |
| 11. Quinolinic acid | 4-hydroxy-2-pyridinecarboxylic acid. |
| 12. 2-Methyl-6-quinolinecarboxylic | 2-methyl-7-hydroxyquinoline. |
| 13. 6-Nitro-isoquinoline-3-carboxylic | 6-nitro-4-hydroxyisoquinoline. |

To illustrate the application of the reaction to an operation at atmospheric pressure, 1-naphthoic acid is melted in a reaction vessel fitted with a stirrer, and cupric naphthoate is dissolved therein in amount of about 0.05 mol per mol of naphthoic acid. The mixture is heated to 240° C. and a stream of steam mixed with air is bubbled slowly through the mixture. When the amount of carbon dioxide liberated from the reaction is about one mol for each mol of naphthoic acid originally present, the organic material remaining in the reaction vessel and that which has been condensed from the effluent gas stream is found to consist of unchanged naphthoic acid, naphthalene and beta-naphthol, with beta-naphthol being the principal phenolic product.

Many variations in procedure are possible, as it has been found that the defined carboxylic acids are converted to significant amounts of phenolic compounds whenever they are heated to a temperature at which carbon dioxide is liberated in contact with a cupric compound.

I claim:

1. The method which comprises heating in contact with a medium consisting essentially of a cupric compound and water, to a temperature above 200° C. at which carbon dioxide is evolved but below the temperature of destructive carbonization, a carboxylic acid having at least one unsubstituted position on the nucleus adjacent the point of attachment of the carboxyl group, having the general formula R—COOH, wherein R is a member of the group consisting of naphthyl, pyridyl, quinolyl and isoquinolyl nuclei, in which any non-carboxyl substituent is inert to the oxidizing action of cupric ions.

2. The method claimed in claim 1, wherein at least part of the reaction is carried out in contact with gaseous oxygen.

3. The method claimed in claim 1, wherein the acid subjected to treatment is a naphthoic acid.

4. The method claimed in claim 1, wherein the acid subjected to treatment is a pyridinecarboxylic acid.

5. The method claimed in claim 1, wherein the acid subjected to treatment is a quinolinecarboxylic acid.

6. The method claimed in claim 1, wherein the acid subjected to treatment is nicotinic acid.

References Cited in the file of this patent

UNITED STATES PATENTS 2,009,043    Dahlen et al. _____ July 23, 1935
2,657,207    Herring _____ Oct. 27, 1953